United States Patent [19]

Berit

[11] 4,162,981

[45] Jul. 31, 1979

[54] DISCHARGER FOR CENTRIFUGES

[75] Inventor: Bradley I. Berit, New Paltz, N.Y.

[73] Assignee: The De Laval Separator Company, Poughkeepsie, N.Y.

[21] Appl. No.: 912,027

[22] Filed: Jun. 2, 1978

[51] Int. Cl.² ........................ B01D 33/10; B01D 35/16

[52] U.S. Cl. ...................................................... 210/375

[58] Field of Search ............... 210/360 A, 360 R, 369, 210/372, 374, 375; 233/1 A; 277/136, 181

[56] References Cited

U.S. PATENT DOCUMENTS

| | | | |
|---|---|---|---|
| 3,309,015 | 3/1967 | Jung et al. | 210/375 |
| 3,458,208 | 7/1969 | Jung | 277/136 |
| 3,874,063 | 4/1975 | Skinner et al. | 277/181 |

*Primary Examiner*—Frank Sever

*Attorney, Agent, or Firm*—Cyrus S. Hapgood

[57] ABSTRACT

In a basket centrifuge, a hollow boss extending downwardly through a hole in the stationary frame cover is secured to the cover, and a shaft extending downwardly through said boss is mounted for rotation in a sleeve secured to the upper portion of the boss, a scraper being carried by the shaft below said boss. Means are mounted on said sleeve for rotating the shaft in opposite directions to swing the scraper toward and from the annular wall of the rotating basket, thereby scraping material deposited centrifugally on said wall. A collar surrounding the shaft below said boss has annular means in sealing engagement with the shaft, and releasable means are provided for urging the collar upwardly in sealing engagement with said boss.

5 Claims, 4 Drawing Figures

3
26
25
21
11
20
24
24
25a
15
25a
27
3

16a
18
12
16
13
14
16
14
3
13a
11
9
9
2
20
24
21
24
25
2
25a
15c
26
A
15b
15a
10
15
A

DISCHARGER FOR CENTRIFUGES

This invention relates to centrifuges of the rotary basket type having a discharger shaft extending downwardly through the stationary frame cover and rotatable in opposite directions to swing a scraper toward and away from the annular wall of the rotary basket, to scrape centrifugally deposited material therefrom and thereby effect discharge of the material. More particularly, the invention relates to releasable means for sealing the discharger shaft below the stationary frame cover of the centrifuge.

For sanitary purposes, such sealing means should be readily removable to permit cleaning thereof; but prior centrifuges have left much to be desired in this respect.

The principal object of the present invention is to provide a basket centrifuge having improved means for sealing the discharger shaft and which can be readily removed for cleaning.

In a basket centrifuge made according to the invention, the discharger shaft is mounted for rotation in a hollow boss extending downwardly through a hole in the stationary frame cover and secured to this cover. A collar surrounding the shaft below the hollow boss has annular means in sealing engagement with the shaft, and releasable means are provided for urging the collar upwardly in sealing engagement with the boss.

In the preferred construction, the aforesaid collar has a downwardly tapering outer wall, the releasable means including a generally U-shaped clip straddling the collar and having its legs removably received in diametrically opposed ears depending from the hollow boss. The clip coacts with the tapered outer wall of the collar, and with overlying pins protruding from the collar, to urge the collar upwardly against the hollow boss. Thus, the collar can be readily lowered from the hollow boss by disengaging the clip legs from the depending ears.

For a better understanding of the invention, reference may be made to the following description in conjunction with the accompanying drawings, in which.

Figures 1, 2:
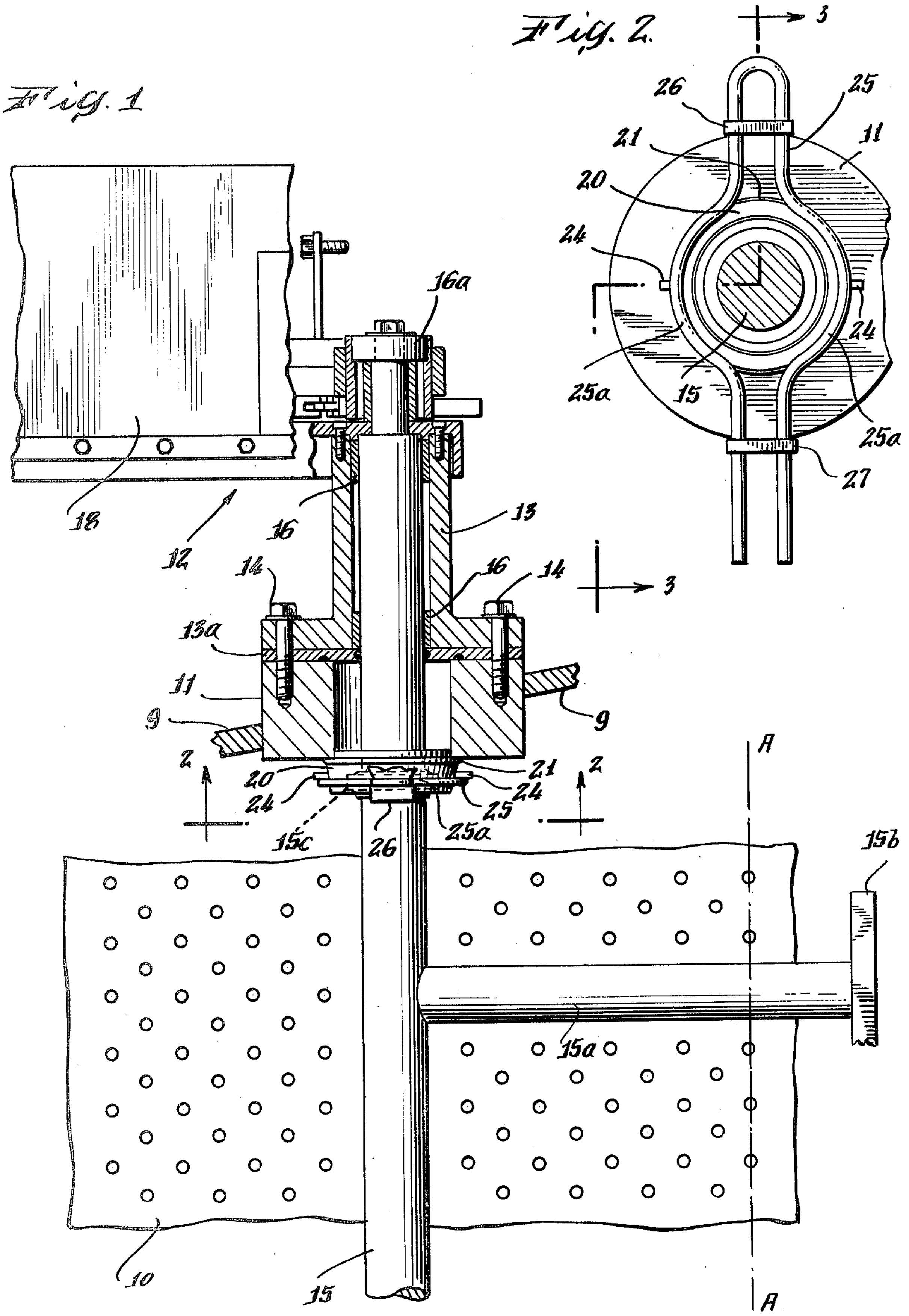
FIG. 1 is a vertical sectional view of a basket centrifuge embodying a preferred form of the invention, with parts broken away.
FIG. 2 is a sectional view on line 2—2 in FIG. 1.
Figure 3:
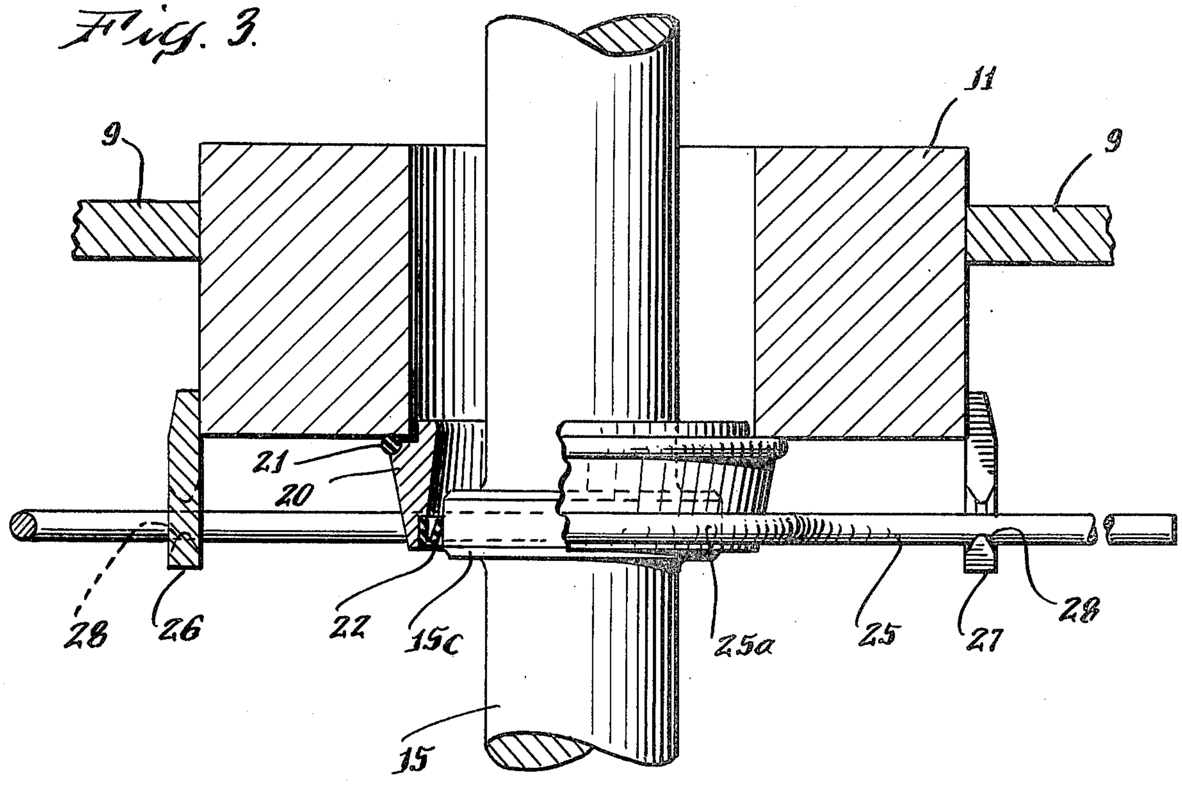
FIG. 3 is a view on line 3—3 in FIG. 2, the view being partly in section and partly in elevation.
Figure 4:
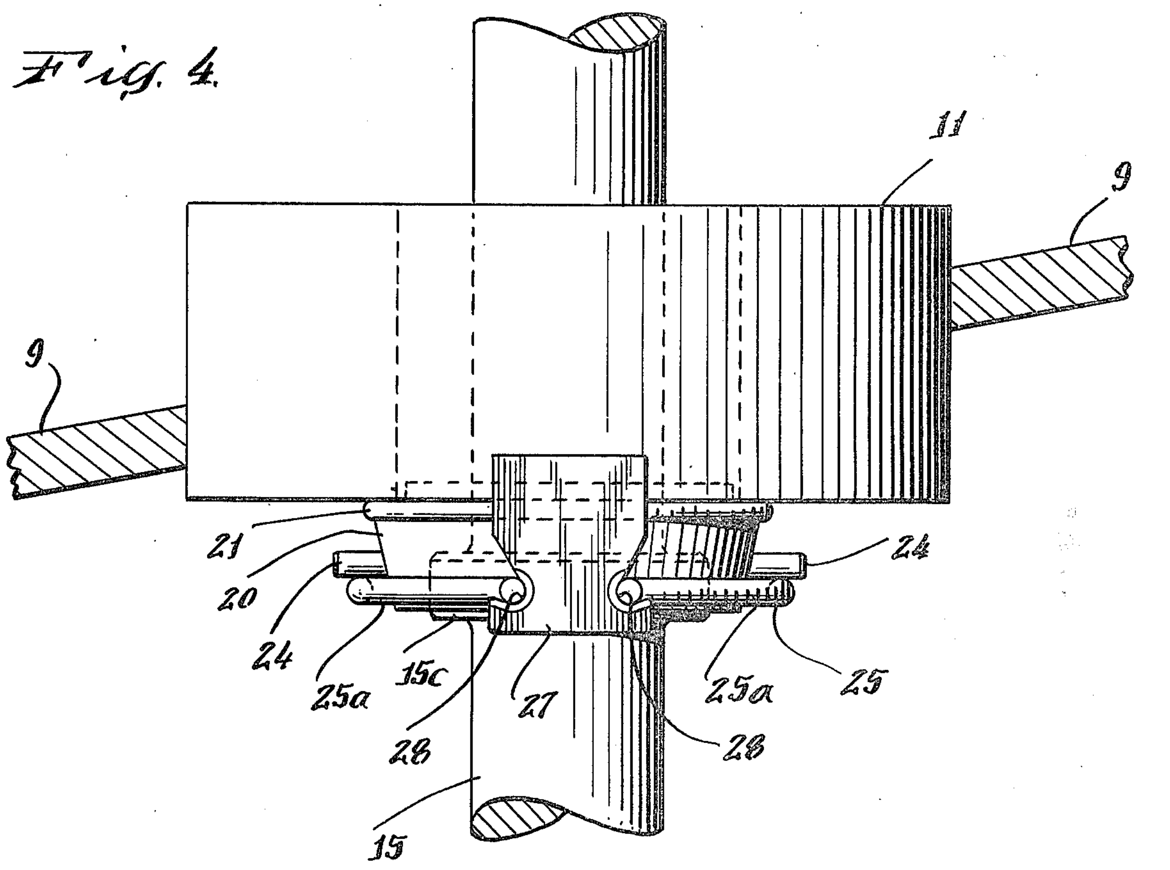
FIG. 4 is an elevational view as seen from the open end of the U-shaped clip in FIG. 2.

Referring to the drawings, the basket centrifuge comprises a hollow cylindrical frame (not shown) having a top cover 9 releasably secured to the frame. Mounted for rotation within the stationary frame is a perforated basket, part of which is shown at 10. Basket 10 is adapted to be rotated by any suitable means (not shown) about a vertical axis A—A coinciding with the axis of the cylindrical frame. The frame cover 9 slopes downwardly from its center located on the vertical axis A—A.

A hollow boss 11 extends vertically through a hole in frame cover 9, to which the boss is welded. A discharger mechanism, shown generally at 12, has a sleeve 13 provided with a bottom flange which is secured to boss 11 by machine screws 14. A sealing gasket 13*a* is clamped between the parts 11 and 13.

Discharger mechanism 12 includes a vertical shaft 15 rotatable in bearings 16 in sleeve 13, the shaft extending downwardly through boss 11 and through an opening in the upper end of basket 10. Shaft 15 has its axis offset laterally from the basket axis A—A and is provided with a horizontal arm 15*a* carrying a vertical scraper blade 15*b*, only the upper part of which is shown. Shaft 15 is also provided at its lower end with a second arm (not shown) connected to the lower part of scraper 15*b* to fix it securely to the shaft.

A housing 18 of discharger mechanism 12 is secured to sleeve 13 and contains a suitable power source (not shown) operatively connected to shaft 15 for rotating it intermittently in opposite directions, thereby swinging scraper 15*b* toward and away from the periphery of rotary basket 10. Shaft 15 is releasably retained against downward displacement, as by means of a thrust bearing 16*a*.

As will be apparent to those skilled in the art, the mixture of liquid and solids to be centrifuged is introduced into the rotating basket 10 by way of a feed pipe (not shown) extending downwardly through an opening in frame cover 9. Under the action of centrifugal force, the solids are compacted against the perforated cylindrical wall of the basket while the liquid passes through the basket perforations into the annular space between the basket and the surrounding wall of the stationary frame, from which the liquid is discharged as an effluent. To discharge the solids, the mechanism 12 is operated to rotate shaft 15 in the direction to swing scraper 15*b* outwardly from axis A—A and against the rotating layer of accumulated solids, the solids thus removed from the basket wall being discharged by gravity through the bottom of the basket. When sufficient solids have been discharged, the mechanism 12 is operated to return scraper 15*b* to its initial position where it cannot interfere with the centrifuging of additional mixture fed into the basket.

For certain purposes, it is desirable to seal the interior of basket 10 from the interior of hollow boss 11. As shown, this sealing is accomplished by means including a collar 20 surrounding shaft 15 and carrying an O-ring 21 which seals against the bottom of boss 11. The sealing means also include a lip seal 22 surrounding shaft 15 and received in an internal recess in collar 20, the seal 22 being compressed between collar 20 and the outer surface of an annular enlargement or protruding ring of shaft 15. Thus, the lip seal is retained in position by its tendency to expand against the confining parts 15*c* and 20. The outer wall of collar 20 tapers downwardly, for a reason to be described presently.

Collar 20 is releasably held in its sealing position by retaining means comprising diametrically opposed pins 24 protruding radially from collar 20 and disposed in overlying engagement with a generally U-shaped spring clip 25. The retaining means also include diametrically opposed ears 26 and 27 depending from the periphery of boss 11 and each having rounded cut-outs 28 in its opposite side edges. From the closed end of clip 25, its legs extend through the cut-outs 28 of ear 26 and then partly around collar 20, where the legs diverge and then converge in arcuate portions 25*a* (FIG. 2). From these arcuate portions, the clip's legs extend through cut-outs 28 of ear 27 and thence to the free ends of the legs.

The clip 25 has a spring action which tends to force its legs together. To secure the sealing means, collar 20 is held manually against the bottom of boss 11 while forcibly applying the clip so that the arcuate portions 25*a* of its legs straddle collar 20 below the pins 24; and at this point the legs should be locked in the cut-outs 28 of ear 26. The free end portions of the legs are then spread apart, forced upward, and snapped into the cut-outs of the other ear 27. Since clip 25 is now held by ears 26–27 against downward displacement, and since the clip's legs are now pressed toward each other against the downwardly tapering wall of collar 20, these legs exert an upward force against the overlying pins 24, thereby urging the O-ring 21 against the boss 11 and holding the collar in sealing position. Thus, the clip may be said to exert a camming action against collar 20 to press it against the bottom of boss 11.

The sealing means can be easily displaced for cleaning purposes by spreading the clip legs apart to release them from the ears 26–27 and then lowering the clip and the collar 20 from boss 11.

I claim:

1. In combination with a centrifugal separator including a basket mounted for rotation about an axis and having an annular wall surrounding said axis, and a stationary frame cover overlying the basket, said cover having a hole offset from said axis, a discharger comprising a hollow boss secured to said cover and extending downwardly through said hole, a shaft mounted for rotation in said boss and extending downwardly through said boss, a scraper carried by the shaft below said boss, means mounted on said cover for rotating the shaft intermittently in opposite directions to swing the scraper toward and away from said annular wall, thereby scraping deposited material from the interior of said wall as the basket rotates, a collar surrounding the shaft below said boss and having annular means in sealing engagement with the shaft and with said boss, and releasable means for urging the collar upwardly into sealing engagement with said boss, said collar having a downwardly tapering outer wall, said releasable means including a generally U-shaped clip having legs which straddle said collar, and means depending from said boss for releasably retaining the clip with its legs pressed against said downardly tapering wall.

2. The combination of claim 1, in which each clip leg has an arcuate portion extending partly around the collar and pressed against said tapering wall.

3. The combination of claim 1, in which said depending means are ears located, respectively, near opposite ends of the clip and each engaged by said legs.

4. The combination of claim 3, in which each ear has cut-outs at opposite sides thereof for receiving respective legs of the clip.

5. The combination of claim 1, comprising also pins projecting outwardly from said tapering wall into overlying contact with respective legs of the clip.

* * * * *